US010719538B2

(12) United States Patent
Timm et al.

(10) Patent No.: US 10,719,538 B2
(45) Date of Patent: Jul. 21, 2020

(54) METHODS AND SYSTEMS FOR IDENTIFYING LOCAL SEARCH QUERIES

(71) Applicant: Oath Inc., Dulles, VA (US)

(72) Inventors: Sean Christopher Timm, Herndon, VA (US); Sudhir Achuthan, Vienna, VA (US); Mikhail Nicholaos Barrett, Fairfax, VA (US)

(73) Assignee: OATH INC., Dulles, VA (US)

( * ) Notice: Subject to any disclaimer, the term of this patent is extended or adjusted under 35 U.S.C. 154(b) by 513 days.

(21) Appl. No.: 15/682,490

(22) Filed: Aug. 21, 2017

(65) Prior Publication Data

US 2017/0344628 A1 Nov. 30, 2017

Related U.S. Application Data

(63) Continuation of application No. 13/633,488, filed on Oct. 2, 2012, now Pat. No. 9,767,185.

(51) Int. Cl.
| | | |
|---|---|---|
| G06F 16/332 | (2019.01) | |
| G06F 16/9535 | (2019.01) | |
| G06F 16/335 | (2019.01) | |
| G06F 16/95 | (2019.01) | |

(52) U.S. Cl.
CPC ........ *G06F 16/3325* (2019.01); *G06F 16/337* (2019.01); *G06F 16/95* (2019.01); *G06F 16/9535* (2019.01)

(58) Field of Classification Search
None
See application file for complete search history.

(56) References Cited

U.S. PATENT DOCUMENTS

| 8,195,653 | B2 | 6/2012 | Dandekar et al. |
|---|---|---|---|
| 8,402,031 | B2 | 3/2013 | Govani et al. |
| 8,412,699 | B1 | 4/2013 | Mukherjee et al. |
| 2003/0014501 | A1 | 1/2003 | Golding et al. |
| 2006/0085392 | A1 | 4/2006 | Wang et al. |
| 2008/0243821 | A1 | 10/2008 | Delli Santi et al. |
| 2010/0088322 | A1 | 4/2010 | Chowdhury et al. |
| 2010/0174703 | A1 | 7/2010 | Dandekar et al. |
| 2011/0055189 | A1 | 3/2011 | Effrat et al. |

OTHER PUBLICATIONS

International Search Report and Written Opinion dated Aug. 1, 2014 in corresponding International Application No. PCT/US2013/059368, 9 pages.
Backstrom et al., "Spatial Variation in Search Engine Queries", Proceeding of the 17th International Conference on World Wide Web, WWW 2008, Apr. 21-25, 2008, 10 pages.

*Primary Examiner* — James Trujillo
*Assistant Examiner* — John J Morris
(74) *Attorney, Agent, or Firm* — Bookoff McAndrews, PLLC (57) ABSTRACT

Methods and systems are provided for determining whether a search query with an observed number of occurrences in a set of search queries is a local search query. In accordance with one implementation, a method is provided that comprises determining an expected number of occurrences of a search query and comparing the expected number of occurrences to a threshold. Further, the method includes determining whether the search query is a local search query based, at least in part, on the comparison.

20 Claims, 5 Drawing Sheets

METHODS AND SYSTEMS FOR IDENTIFYING LOCAL SEARCH QUERIES

CROSS-REFERENCE TO RELATED APPLICATION

This application is a continuation of and claims the benefit of priority to U.S. application Ser. No. 13/633,488, filed Oct. 2, 2012 (now allowed). The disclosure of the above-referenced application is expressly incorporated herein by reference to its entirety.

TECHNICAL FIELD

The present disclosure relates to the field of computerized data processing and search query analysis. More particularly, and without limitation, the present disclosure relates to methods and systems for determining whether search queries are local search queries that have a local interest to a geographical region.

BACKGROUND

Search queries, including those that originate from users via a computerized or electronic submission process, can be analyzed by a search engine or other processor to identify information corresponding or related to each respective search query. The search queries may be submitted over an electronic network, such as a collection of networks, spanning numerous localities or geographies, such as the Internet. Users may submit search queries from various devices, such as personal computers, laptops, PDAs, mobile devices, smart phones, and so on.

Search queries may be determined to have a global or local interest. Search queries that are determined to have a local interest may be useful in a variety of contexts. Search queries may have a local interest if, for example, the search queries originate from users in a particular geographical region at a relatively high frequency. Search queries that are determined to originate from a particular geographical region at a relatively high frequency can be used to influence search results for a user in the particular geographical region or search results that are otherwise associated with the geographical region. Search results influenced by local interest can be found to be more relevant to a search query. Local interest is not limited in type to geographical regions; for example, search queries may also have a local interest if, for example, the search queries originate from a particular demographic at a relatively high frequency.

Techniques exist for determining whether a search query has a local interest. For example, in one technique, a set of search queries and corresponding IP addresses for the corresponding users' devices may be obtained. The geographical regions associated with the search queries may be determined by comparing the corresponding IP addresses to a lookup table that stores data linking IP addresses with geographical regions. If a search query originates from a particular geographical region at a relatively high frequency, as compared to other geographical regions, the search query may be determined to have a local interest with the particular geographical region. However, if a search query has a low absolute frequency in a particular geographical region, it may only be possible to determine with a low reliability whether the search query originates from the particular geographical region at a relatively high frequency, as compared to other geographical regions.

Accordingly, and in view of the foregoing, there is a need for improved methods and systems that are capable of determining whether search queries are local search queries that have a local interest to a geographical region. Moreover, there is a need for improved methods and systems for determining whether a search query has a local interest, including for low absolute frequency search queries. There is also a need for such methods and systems that overcome the drawbacks and limitations of conventional search query techniques.

SUMMARY

The present disclosure relates to embodiments for search query analysis and determining whether a set of search queries submitted electronically from users are local search queries that have a local interest to a geographical region. Moreover, embodiments of the present disclosure include methods and systems that are capable of determining whether search queries are local search queries or otherwise relevant to a geographical region. Embodiments of the present disclosure also relate to methods and systems that determine whether a search query has a local interest, including for low absolute frequency search queries. As will be appreciated, methods and systems consistent with embodiments of the present disclosure may be implemented with any combination of hardware, software, and/or firmware, including computerized methods and systems and those embodied with processors or processing components.

In one embodiment consistent with the present disclosure, a computerized method is provided for determining whether a search query with an observed number of occurrences in a set of search queries is a local search query. The method may include the following steps, wherein one of more of the steps are performed by at least one processor: determining an expected number of occurrences of the search query; comparing the expected number of occurrences to a threshold; and determining whether the search query is a local search query, wherein the local search query determination is based, at least in part, on the comparison.

In another embodiment consistent with the present disclosure, a computerized method is provided for determining whether a search query with an observed number of occurrences in a set of search queries is a local search query. The method may include the following steps, wherein one or more of the steps are performed by at least one processor calculating a first score by comparing the observed number of occurrences of the search query in the set of search queries with an expected number of occurrences of the search query in the set of search queries; calculating one or more additional scores by comparing one or more observed numbers of occurrences of additional search queries related to the search query with one or more expected numbers of occurrences of the related search queries; and determining whether the search query is a local search query based, at least in part, on the first score and the one or more additional scores.

In still another embodiment consistent with the present disclosure, a system is provided for determining whether a search query with an observed number of occurrences in a set of search queries is a local search query. The system comprises a processor, a memory device, and program code stored in the memory. The program code stored in the memory device, when executed by the processor, causes the processor to perform the following steps: determining an expected number of occurrences of the search query; comparing the expected number of occurrences to a threshold;

and determining whether the search query is a local search query, wherein the local search query determination is based, at least in part, on the comparison.

Additional aspects and embodiments consistent with the present disclosure will be set forth in part in the description which follows, and in part will be obvious from the description, or may be learned by practice of the invention, as claimed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments herein include computer-implemented methods, tangible non-transitory computer-readable mediums, and computer-implemented systems. The computer-implemented methods may be executed, for example, by a processor that receives instructions from a non-transitory computer-readable storage medium. Similarly, the systems disclosed herein may include at least one processor and memory, and the memory may be a non-transitory computer-readable storage medium.

As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums.

As referred to herein, a "memory" may comprise any type of computer-readable storage medium unless otherwise specified. A computer-readable storage medium may store instructions for execution by a processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

In accordance with certain embodiments, methods and systems are provided for determining whether a search query is a local search query. In some embodiments, the methods and systems determine an expected number of occurrences of the search query. In addition, in some embodiments, the methods and systems compare the expected number of occurrences to a threshold. In some embodiments, the methods and systems determine whether the search query is a local search query, wherein the local search query determination is based, at least in part, on the threshold comparison.

In some embodiments, if it is determined that the expected number of occurrences is above a threshold, a first set of operations is performed. For example, a first score may be calculated by comparing the observed number of occurrences of the search query in the set of search queries with the expected number of occurrences of the search query in the set of search queries. The first score may then be analyzed to determine whether the search query is a local search query.

In some embodiments, if it is determined that the expected number of occurrences is below a threshold, a second set of operations is performed. For example, a first score may be calculated by comparing the observed number of occurrences of the search query in the set of search queries with the expected number of occurrences of the search query in the set of search queries. In addition, one or more additional scores may be calculated by comparing one or more observed numbers of occurrences of search queries related to the search query with one or more expected numbers of occurrences of the related search queries. The first score and the one or more additional scores may then be analyzed to determine whether the search query is a local search query. In some embodiments, the second set of operations is used to determine whether a search query is a local search query regardless of the expected number of occurrences of the search query.

Figure 1:
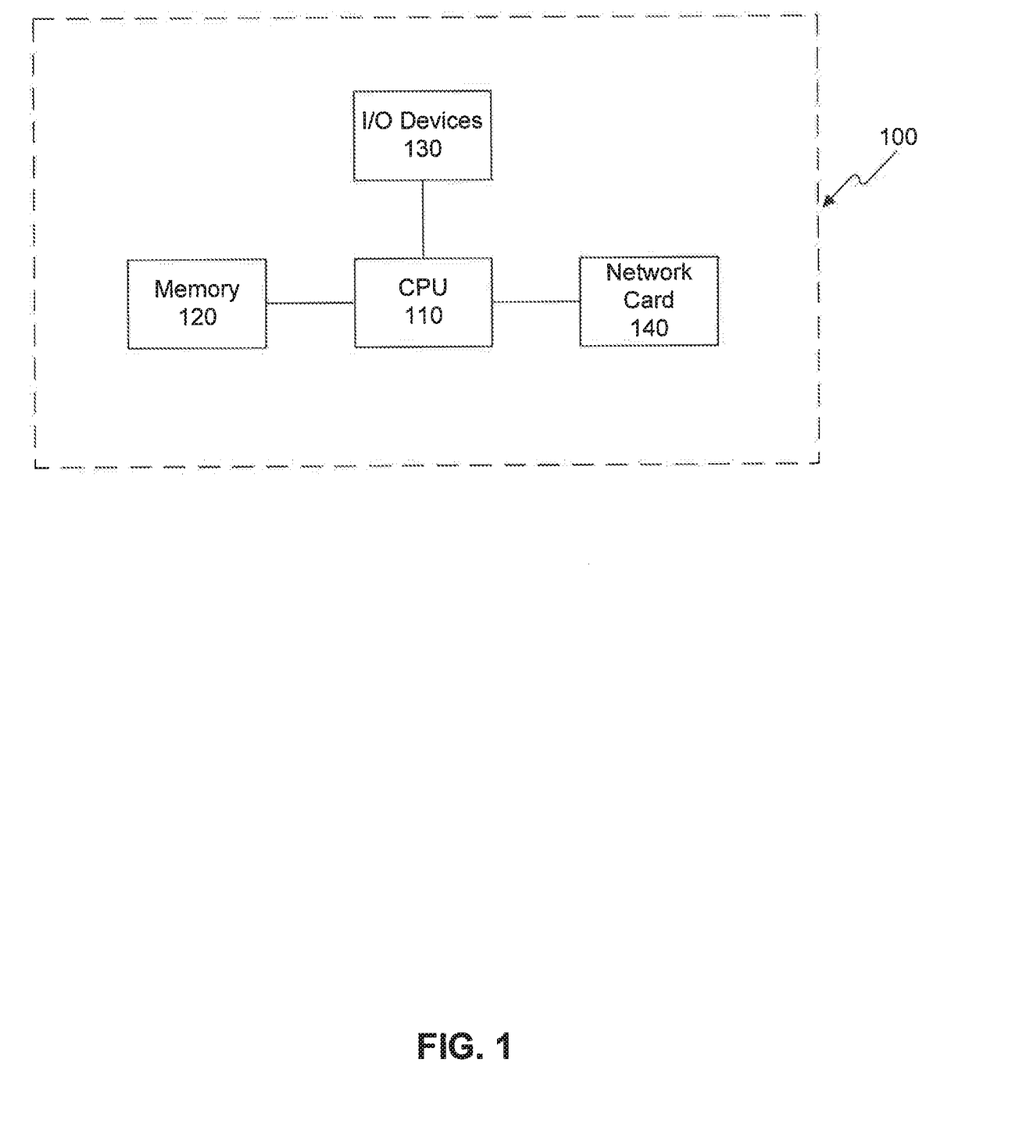
FIG. 1 illustrates an exemplary device that may be used for implementing embodiments consistent with the present disclosure.

FIG. 1 is a diagram illustrating an exemplary device 100 that may be used for implementing embodiments consistent with the present disclosure. Device 100 may be a server, laptop computer, desktop computer, PDA, mobile phone, smart phone, or other type of computing device. Device 100 may include, among other things, one or more of the following components: central processing unit (CPU) 110 configured to execute computer program code to perform various processes and methods, including the embodiments herein described; memory device 120, such as RAM, EEPROM, hard disk, and flash memory, to store data and computer program code; I/O devices 130, such as keyboards and displays; and network card 140 configured to enable device 100 to send and receive data.

Figure 2:
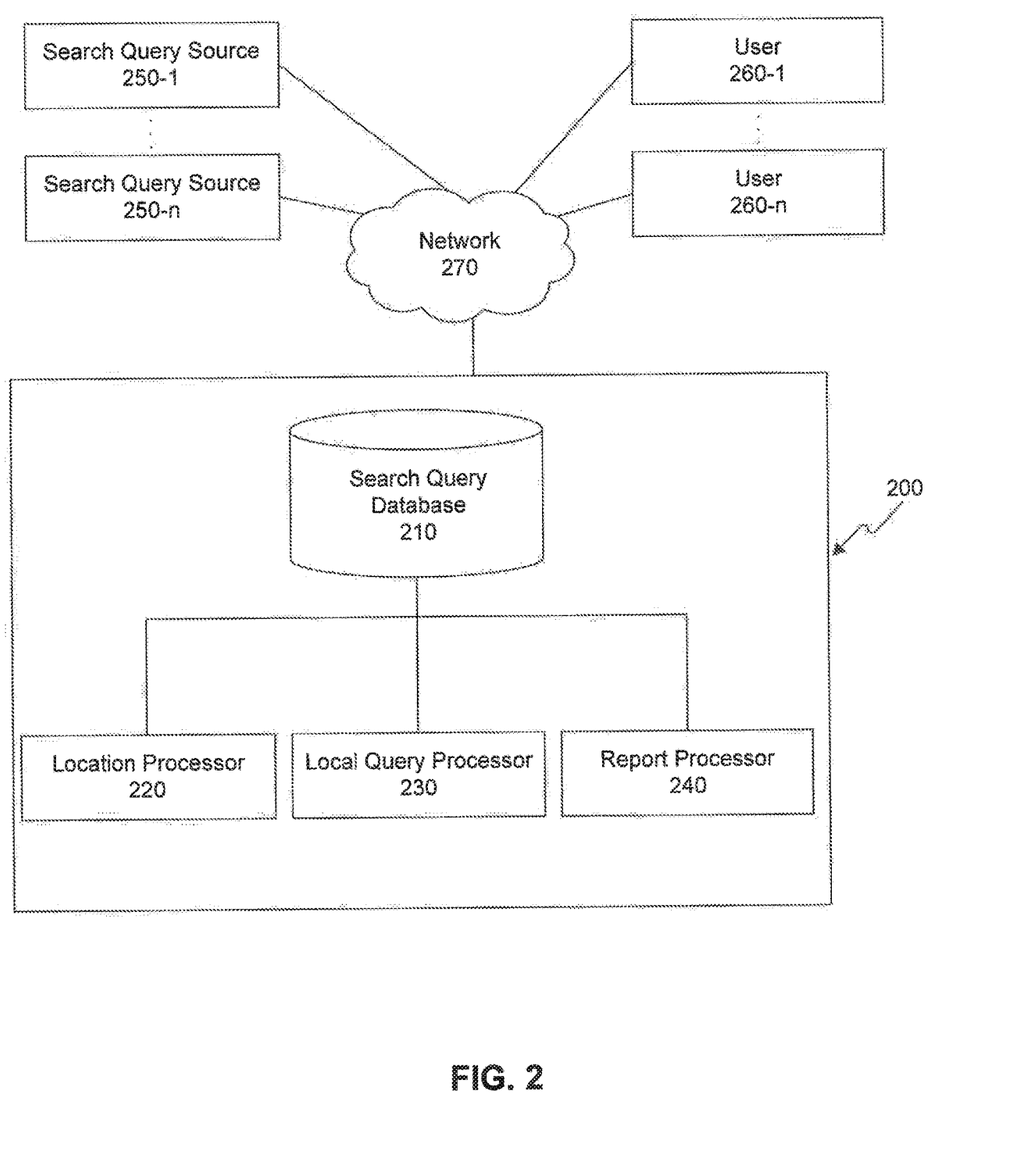
FIG. 2 illustrates an exemplary system that may be used for implementing embodiments consistent with the present disclosure.

FIG. 2 is a diagram illustrating an exemplary system 200 that may be used for implementing embodiments consistent with the present disclosure. Exemplary system 200 may include a search query database 210. Search query database 210 may store data regarding one or more search queries, such as, for example, data regarding the text of a search query and the IP address of a user device or other computing device from which a search query originates. Search query database 210 may also store other data regarding one or more search queries, such as, for example, the time a search query was made or the demographic of the user that made the search query. In some embodiments, the search query database 210 includes data regarding search queries from a wide variety of geographical regions. For example, search query database 210 may include data regarding search queries from a variety of geographical regions in the United States. In some embodiments, the search query database 210 periodically deletes or archives data that is older than a set amount. For example, the search query database 210 may only retain data that is no more than one week old.

Search query database 210 may obtain data regarding one or more search queries from one or more search query sources 250 via a network 270. For example, search query database 210 may obtain data regarding one or more search queries from a server (for example, a web server or back-end processing server) that processes search queries originating from one or more user devices.

System 200 may also include a location processor 220. In some embodiments, location processor 220 is configured as a computing device such as, for example, device 100 of FIG. 1. Location processor 220 may determine a geographical region that corresponds to an IP address associated with a search query by, for example, comparing the IP address to a lookup table that stores data linking or associating one or more IP addresses with one or more geographical regions. In some embodiments, if it is determined that a search query originates from a geographical region with a small quantity of other search queries, location processor 220 associates the search query with a nearby geographical region having a larger quantity of other search queries. In addition, in some embodiments, location processor 220 may determine a plurality of geographical regions associated with a search query. For example, a city and state associated with a search query may be determined. A geographical region may represent both contiguous and non-contiguous geographical regions.

System 200 may also include a local query processor 230. In some embodiments, local query processor 230 is configured as a computing device such as, for example, device 100 of FIG. 1. Local query processor 230 may determine whether a search query is a local search query. The determination may be made, for example, using the techniques disclosed below with respect to the exemplary embodiments of FIGS. 3-5.

System 200 may also include a report processor 240. In some embodiments, report processor 240 is configured as a computing device such as, for example, device 100 of FIG. 1. Report processor 240 may generate reports regarding search queries, such as those determined to be local search queries. For example, report processor 240 may generate a report including the text of one or more local search queries and one or more geographical regions associated with the one or more local search queries. By way of example, the reports may provide an indication of trending data in a geographical region that may be used. One or more users 260, which may be, for example, devices associated with advertisers, customers or internal employees, may receive the generated reports from system 200 via the network 270.

Network 270 may be any one or more of a variety of networks or other types of communication connection know to those skilled in the art. Network 270 may include a network connection, bus, or other type of data link, such as a hardwire, wireless, or other connection known in the art. For example, network 270 may be the Internet, an intranet network, a local area network, or other wireless or other hardwired connection or connections by which search query sources 250, system 200, and users 260 may communicate and exchange information.

While FIG. 2 depicts location processor 220, local query processor 230, and report processor 240 as three separate devices, in some embodiments some or all of the functions or operations associated with location processor 220, local query processor 230, and report processor 240 may be implemented in a single device or distributed with respect to a plurality of devices (e.g., a server farm or a cluster of computers).

Figure 3:
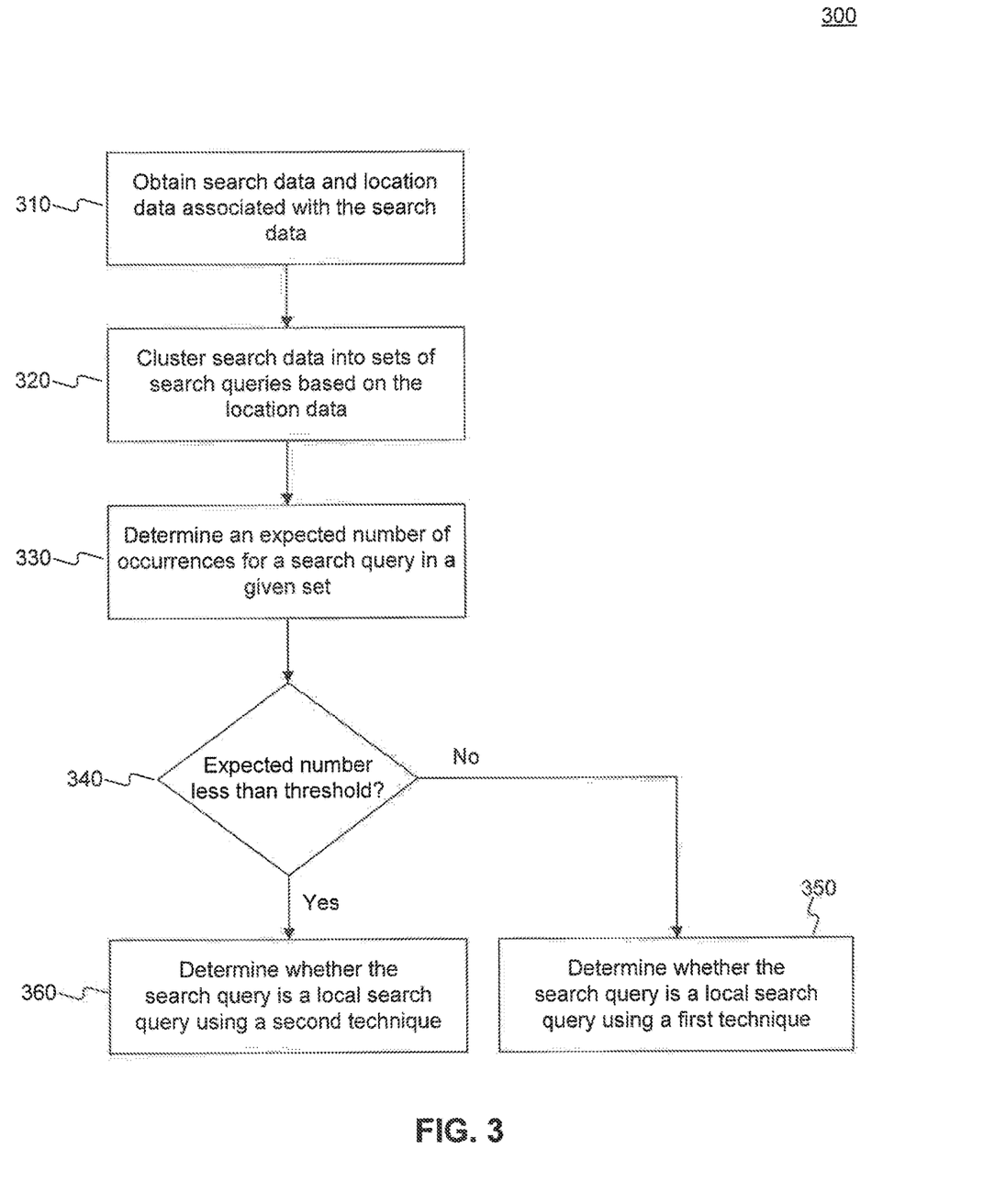
FIG. 3 illustrates an exemplary method for determining whether a search query is a local search query.

FIG. 3 depicts an exemplary method 300 for determining whether a search query is a local search query. In some embodiments, exemplary method 300 begins by obtaining search data and location data associated with the search data (step 310). The search data may be representative of text of one or more search queries. The location data be representative of one or more geographical regions associated with the one or more search queries.

Method 300 may then cluster the search data into sets of search queries based on the location data (step 320). In some embodiments, search data is clustered into sets of search queries corresponding to the same geographical region. In other embodiments, search data is clustered into sets of search queries corresponding to geographical regions within a certain distance. In some embodiments, the total number of occurrences of each search query in each set of search queries is also determined.

An expected number of occurrences of a search query in a given set may be determined (step 330). This determination may be made by first determining the total number of search queries in the given set, the total number of search queries in all of the sets of search queries (including the given set), and the number of occurrences of the search query in all of the sets of search queries. The total number of search queries in the given set may be divided by the total number of search queries in all of the sets of search queries, and the result may be multiplied by the number of occurrences of the search query in all of the sets of search queries to determine the expected number of occurrences of the search query in the given set.

The determined expected number of occurrences of the search query in the given set may then be compared to a threshold value (step 340). In some embodiments, if the expected number is not less than the threshold, a first technique is applied to determine whether the search query is a local search query (step 350). In some embodiments, if the expected number is less than the threshold, a second technique is applied to determine whether the search query is a local search query (step 360). However, in alternative embodiments, the first or second technique is applied without regard to the expected number of occurrences of the search query in the given set.

Figure 4:
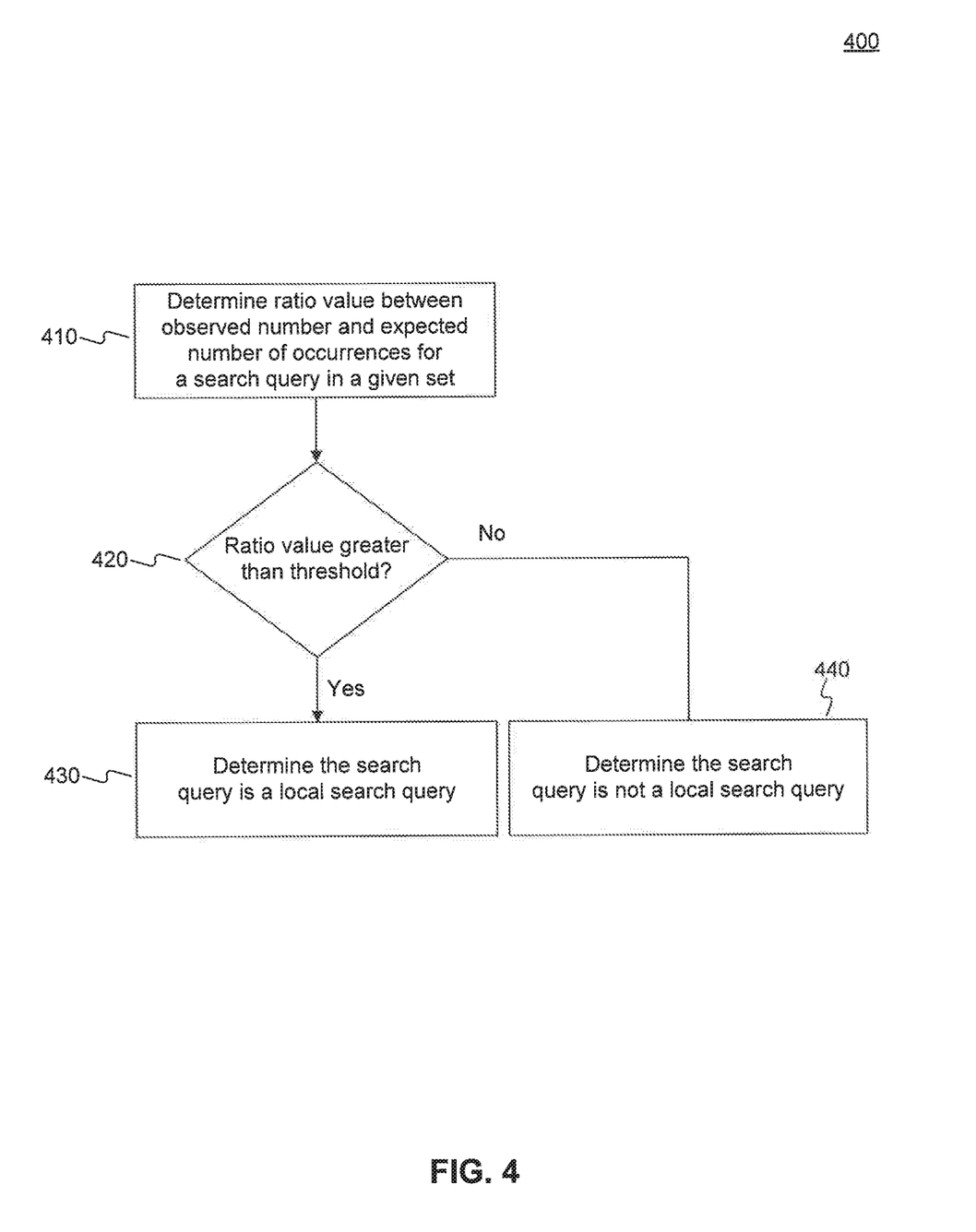
FIG. 4 illustrates an exemplary method for determining whether a search query is a local search query in accordance with a first technique.

FIG. 4 depicts an exemplary method 400 for determining whether a search query is a local search query in accordance with a first technique. In some embodiments, exemplary method 400 begins by determining a value corresponding to the ratio between an observed actual number of occurrences of the search query in the given set and the determined expected number of occurrences for the search query in the given set (step 410). The ratio value may then be compared to a threshold value (step 420). In some embodiments, if the ratio value is determined to be greater than the threshold value, the search query in the given set is determined to be a local search query (step 430). In some embodiments, if the ratio value is determined not to be greater than the threshold value, the search query in the given set is determined not to be a local search query (step 440).

For example, the text of a search query may be "metro access" and a given set may correspond to the geographical region of Washington, D.C. The total number of search queries in all sets may be, for example, 130,915,241, the total number of occurrences of "metro access" in all sets may be, for example, 58, the total number of search queries in the set corresponding to Washington, D.C. may be, for example, 1,956,003, and the total number of occurrences of "metro access" in the set corresponding to Washington, D.C. may be, for example, 49. In this example, the expected number of occurrences of "metro access" in the set corresponding to Washington, D.C. may be equal to ((1,956,003/130,915,214)*58), which equals 0.87. Thus, the ratio value for "metro access" in the set corresponding to Washington, D.C. may be equal to (49/0.87), which equals 56.32. If the threshold value is set to, for example, 1.5, the ratio value would be determined to be above the threshold value, indicating that "metro access" is a local search query with respect to the set corresponding to Washington, D.C.

Figure 5:
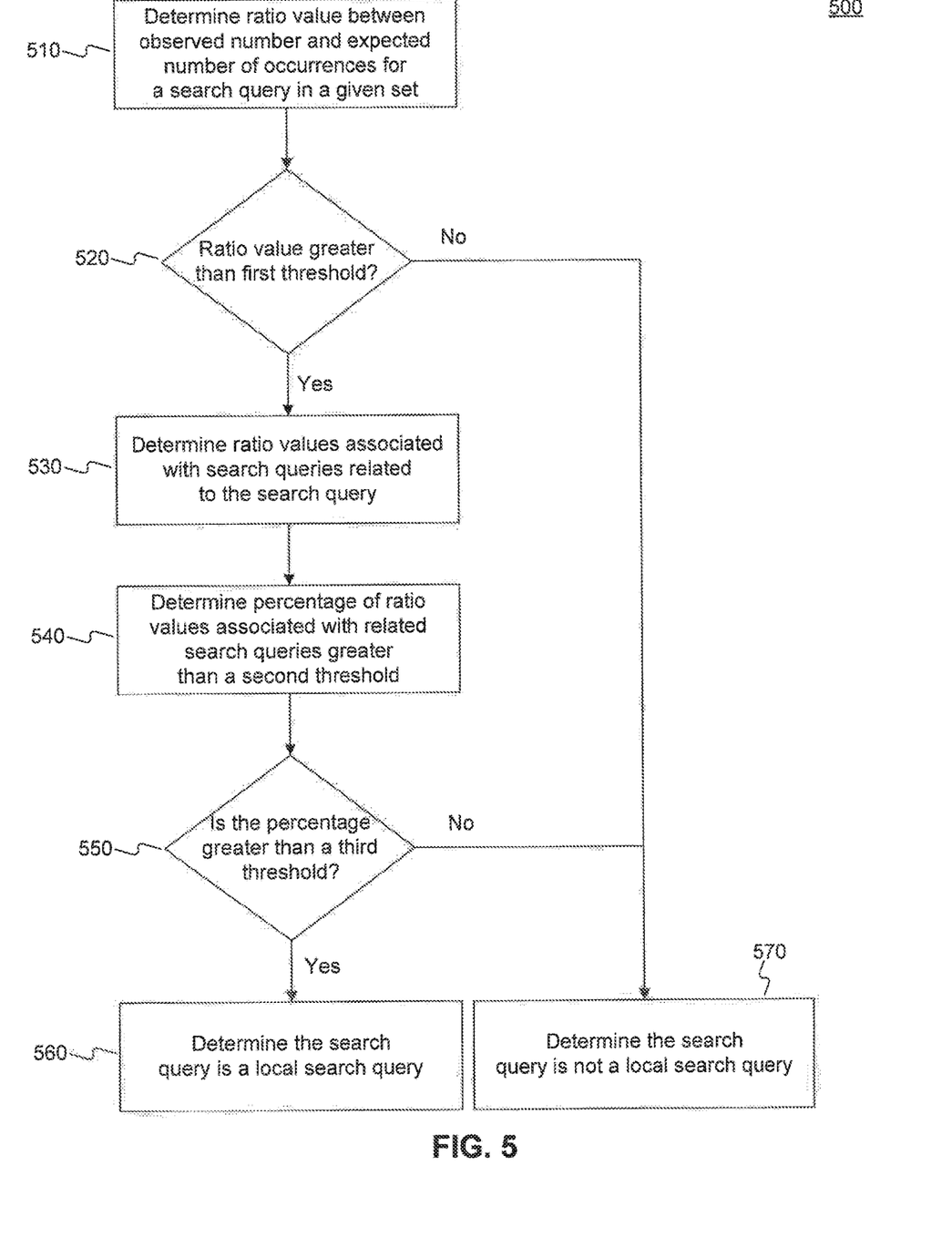
FIG. 5 illustrates an exemplary method for determining whether a search query is a local search query in accordance with a second technique.

FIG. 5 depicts an exemplary method 500 for determining whether a search query is a local search query in accordance with a second technique. In some embodiments, method 500 begins by determining a value corresponding to the ratio between an observed actual number of occurrences of the search query in the given set and the determined expected number of occurrences for the search query in the given set (step 510). The ratio value may then be compared to a first threshold value (step 520). In some embodiments, the first threshold is equal to 1.5. In some embodiments, if the ratio value is determined to not be greater than the first threshold value, the search query in the given set is determined to not be a local search query (step 570).

In some embodiments, if the ratio value is determined to be greater than the first threshold value, ratio values associated with search queries related to the search query may be determined (step 530). As for the search query, a ratio value of a related search query may be determined by determining the ratio between an observed actual number of occurrences of the related search query in the given set and an expected number of occurrences for the related search query in the given set. Related search queries may be determined according to one or more algorithms or may be predetermined. For example, algorithms may be implemented that determine related search queries on the basis of associated or related search terms. By way of example, a search query may be "fairfax county public library" and may have two related search queries, "fcpl" (the initials of the search query) and "fairfaxcountypubliclibrary" (the search query with spaces removed).

A determination may be made as to the percentage of ratio values associated with related search queries greater than a second threshold (step 540). In some embodiments, the second threshold is equal to 1.5. A determination may then be made as to whether the percentage is greater than a third threshold (step 550). In some embodiments, the third threshold is equal to 0.5 (i.e., 50%). In some embodiments, if the percentage is determined to not be greater than the third threshold value, the search query in the given set is determined to not be a local search query (step 570). However, if the percentage is determined to be greater than the third threshold value, the search query in the given set is determined to be a local search query (step 560).

In some embodiments, one or more clusters of related search queries may exist, and a search query may be associated with one or more of the clusters of related search queries. Thus, in some embodiments, if a search query is associated with more than one cluster of related search queries, steps 530-570 are repeated for each cluster of related search queries. In some embodiments, the search query is determined to be a local search query if analysis of at least one cluster of related search queries indicates that the search query is a local search query. In other embodiments, the search query is determined to be a local search query if analysis of more than some percentage (e.g., 50%) of the clusters of related search queries indicates that the search query is a local search query.

As an example of the second technique, the text of a search query may be "fairfax county public library" and a given set may correspond to the geographical region of Washington, D.C. A ratio value, determined in the manner described above, associated with "fairfax county public library" for the set corresponding to Washington, D.C. may be, for example, 50.52. As discussed above, search queries related to "fairfax county public library" may be determined to be "fcpl" and "fairfaxcountypubliclibrary" (i.e., "fairfax county public library", "fcpl", and "fairfaxcountypubliclibrary" may be one cluster of related search queries). Ratio values, determined in the manner described above, associated with "fcpl" and "fairfaxcountypubliclibrary" for the set corresponding to Washington, D.C. may be, for example, 50.92 and 0, respectively. Since the ratio value associated with "fairfax county public library" is greater than 1.5, and since two out of the three ratio values are greater than 1.5, "fairfax county public library" will be determined to be a local search query with respect to the set corresponding to Washington, D.C.

By utilizing related search queries, the second technique discussed above with reference to FIG. 5 may be used to make a more reliable local search query determination for a search query having a relatively low expected number of occurrences in a given set. However, in some embodiments, the second technique may also be used for other search queries, including search queries having a relatively high expected number of occurrences in a given set.

While several embodiments described herein may be implemented to determine whether a search query is a local search query with reference to a geographical region, such embodiments may be additionally or alternatively implemented using the disclosed techniques to determine whether a search query is a local search query with reference to another type, such as, for example, a demographic.

Identification of local search queries can provide a number of benefits. For example, a user device in a geographical region may be presented with local search queries associated with the geographical region. The presented local search queries may allow a user to identify, for example, trending topics and current events within the geographical region. In addition, a database of local search queries may be maintained that is organized by geographical region. Local search queries may also be useful for advertising networks or systems. For example, if a user device is determined to originate from a geographical region, advertisements generated based on local search queries associated with the geographical region may be presented to the user device.

While the present disclosure provides examples of one or more processes or apparatuses, it will be appreciated that other processes or apparatuses can be implemented or adopted to be within the scope of the accompanying claims.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system or existing communications software.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps and/or inserting or deleting steps. It is intended, therefore, that the specification and examples be considered as example only, with a true scope and spirit being indicated by the following claims and their full scope of equivalents.

What is claimed is:

1. A computer-implemented method comprising the following operations performed by at least one processor:
   determining a first score, based on a first ratio between an observed number of occurrences and an expected number of occurrences of a search query;
   calculating a second score, when it is determined that the expected number of occurrences is below a first threshold, based on a second ratio between observed and expected numbers of occurrences of an additional search query related to the search query; and
   determining whether the search query is a local search query based, at least in part, on a comparison of the first score and the second score to a second threshold.

2. The method of claim 1, further comprising:
   determining a percentage of the first and second scores that are greater than a third threshold;
   determining whether the percentage is greater than or equal to a fourth threshold; and
   establishing the search query as the local search query when the percentage is determined to be greater than or equal to the fourth threshold.

3. The method of claim 2, wherein the third threshold is equivalent to the fourth threshold.

4. The method of claim 2, wherein the fourth threshold is 50 percent.

5. The method of claim 1, wherein:
   the search query is stored in a database comprising the additional search query related to the search query.

6. The method of claim 1, wherein the search query is associated with a geographical region.

7. The method of claim 1, further comprising:
   presenting data associated with the local search query to a device, the data representing at least one of an advertisement or trending data.

8. A non-transitory computer-readable medium that stores instructions that, when executed by at least one processor, cause the at least one processor to perform operations comprising:
   determining a first score, based on a first ratio between an observed number of occurrences and an expected number of occurrences of a search query;
   calculating a second score, when it is determined that the expected number of occurrences is below a first threshold, based on a second ratio between observed and expected numbers of occurrences of an additional search query related to the search query; and
   determining whether the search query is a local search query based, at least in part, on a comparison of the first score and the second score to a second threshold.

9. The medium of claim 8, further comprising:
   determining a percentage of the first and second scores that are greater than a third threshold;
   determining whether the percentage is greater than or equal to a fourth threshold; and
   establishing the search query as the local search query when the percentage is determined to be greater than or equal to the fourth threshold.

10. The medium of claim 9, wherein the third threshold is equivalent to the fourth threshold.

11. The medium of claim 9, wherein the fourth threshold is 50 percent.

12. The medium of claim 8, wherein:
    the search query is stored in a database comprising the additional search query related to the search query.

13. The medium of claim 8, wherein the search query is associated with a geographical region.

14. The medium of claim 8, further comprising:
    presenting data associated with the local search query to a device, the data representing at least one of an advertisement or trending data.

15. A system for determining whether a search query is a local search query, comprising:
    a processor;
    a memory device;
    program code stored in the memory device, which, when executed by the processor, causes the processor to perform the steps of:
      determining a first score, based on a first ratio between an observed number of occurrences and an expected number of occurrences of a search query;
      calculating a second score, when it is determined that the expected number of occurrences is below a first threshold, based on a second ratio between observed and expected numbers of occurrences of an additional search query related to the search query; and
      determining whether the search query is a local search query based, at least in part, on a comparison of the first score and the second score to a second threshold.

16. The system of claim 15, wherein the program code further causes the processor to perform the steps of:
    determining a percentage of the first and second scores that are greater than a third threshold;
    determining whether the percentage is greater than or equal to a fourth threshold; and
    establishing the search query as the local search query when the percentage is determined to be greater than or equal to the fourth threshold.

17. The system of claim 16, wherein the third threshold is equivalent to the fourth.

18. The system of claim 16, wherein the fourth threshold is 50 percent.

19. The system of claim 15, wherein:
    the search query is stored in a database comprising the additional search query related to the search query.

20. The system of claim 15, wherein the search query is associated with a geographical region.

* * * * *